July 21, 1970     H. SCHIPPERS     3,521,325

INDUCTIVELY HEATED EXTRUSION DIE

Filed Feb. 6, 1968     2 Sheets-Sheet 1

INVENTOR:
HEINZ SCHIPPERS
BY
*Marzall, Johnston, Cook & Root*
ATT'YS

United States Patent Office 3,521,325
Patented July 21, 1970

3,521,325
INDUCTIVELY HEATED EXTRUSION DIE
Heinz Schippers, Remscheid-Lennep, Germany, assignor to Barmag Barmer Maschinenfabrik Aktiengesellschaft, Wuppertal, Germany
Filed Feb. 6, 1968, Ser. No. 703,300
Claims priority, application Germany, Feb. 15, 1967, B 91,189
Int. Cl. B29f *3/04, 3/08*
U.S. Cl. 18—12      9 Claims

ABSTRACT OF THE DISCLOSURE

Inductively heated extrusion die for thermoplastic polymers in which one induction coil is mounted around the outer circumferential surface of the nozzle plate adjacent the face thereof from which the polymer is extruded, and the nozzle plate containing one or more extrusion channels or bores has at least one annular gap space or air gap with its outer circumference beginning at a point axially intermediate the two ends of the induction coil core and extending inwardly so that its inner diameter is immediately adjacent the extrusion channels or bores, such gap spaces being arranged to deflect or concentrate the applied lines of force from the induction coil in that portion of the nozzle plate immediately surrounding the extrusion channels or bores and/or their outlet openings. This construction is particularly useful in water-cooled granulators.

---

Figure 1:
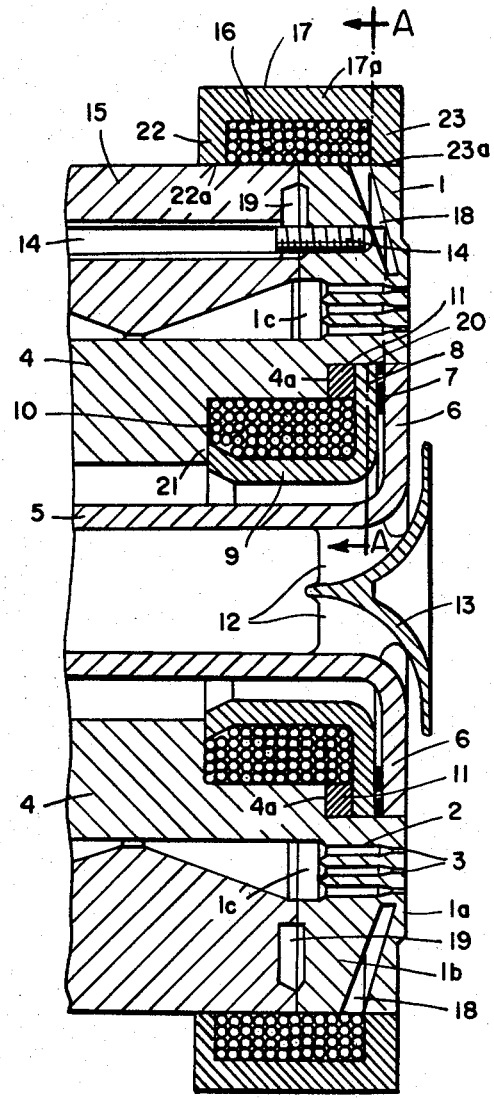

This invention relates to an apparatus for the inductive heating of a thermoplastic substance during its extrusion from the channels or bores of an extrusion die, for example, where the thermoplastic substance is supplied to the die from a screw extruder or the like. More particularly, the invention is concerned with an improvement in the inductive heating of an extrusion die of the type employed in water-cooled granulators. On the other hand, the apparatus of the invention is readily adapted to other types of extruders carrying the essential nozzle plate for extrusion of the thermoplastic substance into a desired shape.

The inductive heating of extrusion equipment is generally known. Thus, it has been proposed in U.S. 3,129,459 that the cylinder of the extruder itself be heated inductively. The electric heating of the extrusion die piece itself is described in German published application No. 1,125,639, wherein the die containing an extrusion channel in the form of a wide slot or slit nozzle is primarily heated by means of a pure resistance heating element. Under some circumstances, however, the patent suggests that it is also possible to employ inductive heating, preferably with low frequency, e.g. main-frequency, alternating current.

In the usual construction of extrusion dies, the core of the induction coil in the form of a jacket or shell must be mounted at some point around the outside of the extrusion die at some distance from the extrusion channels or bores. Thus, the induction coil and its core are especially distant from the outlet portion or mouth openings of the nozzle slits or bores in the extrusion die where heating is primarily necessary. Since the lines of forces proceeding from the coil core through the wall of the extrusion die naturally follow the path of least resistance, i.e. generally the shortest distance between the terminal ends of the core, that zone or portion of the extrusion die along its outer surface lying closest to the coil is not intensely heated. From this point, then, the required heat must still be supplied to the extrusion channels or nozzle slit by means of heat conduction through the solid metal structure of the die itself. The power requirements for such heating are thus quite high, and there is a relatively long heat-regulating interval between the heating source up to a heat sensor or thermocouple arranged directly at the mouth of the nozzle. This results in a poorly regulated heat supply as evidenced by undesirable lags during heat-regulation and correspondingly large fluctuations in the regulated temperature.

The primary object of the present invention is to provide an improved means of inductively heating extrusion dies or so-called nozzle plates, particularly in those devices in which the face of the die is cooled by a fluid cooling medium and in which heating requirements are apt to be quite high. Another object of the invention is to provide an improvement in the inductive heating of an extrusion die where it is necessary to provide at least one induction coil mounted on the outer circumference of the die with a large radial distance between the induction coil and the extrusion channels and/or outlets in the die. Other objects and specific advantages of the invention are discussed more fully hereinbelow.

It has now been found in accordance with the invention that heat can be effectively and efficiently generated by induction at points in close proximity to one or more extrusion bores or channels and/or their outlets in an extrusion die or nozzle plate composed of a magnetizable material if the nozzle plate is so constructed and arranged as to contain at least one annular gap space, and preferably at least two such gap spaces axially adjacent one another and adapted to contain a non-magnetizable substance, each of said gap spaces having its outermost diameter axially positioned within or between the two radial flanges or legs of the induction coil core which enclose the coil windings and the annular gap space then extending inwardly away from the outer circumferential surface of the die or nozzle plate up to an area defined by the innermost diameter of the annular gap space which is positioned in the immediate vicinity of the extrusion channels or bores, preferably such that the annular gap space is inclined or tapered conically forwardly toward the annular or circular center portion of the face of the die in which one or more extrusion outlets are arranged. In other words, the die or nozzle plate should contain at least one air gap or a gap space radially recessed inwardly from the outer circumferential surface of the die, preferably beginning immediately adjacent and behind the forward leg of the coil core, such that the lines of force or magnetic field lines from the induction coil are deflected to flow in a path passing radially inwardly along the face of the die, preferably in an inwardly constricted radial cross-section of the face portion of the die, and then passing in the immediate vicinity of the nozzle bores or channels and their outlet openings.

Thus, in order to yield the best results for the inductive heating of the thermoplastic material as it is extruded through the extrusion channels, non-magnetizable means such as an air gap or an annular space filled with some other substance incapable of transmitting the magnetic field lines must be positioned to obstruct the normal path of such field lines extending directly beneath the coil windings between the annular flanges or legs of the coil core, and at the same time, the air gap or annular space should direct or compel the magnetic field lines to flow inwardly in close proximity to the extrusion channels and preferably in a constricted path immediately adjacent to the outlet openings of these channels in the face of the die.

It has proven to be especially advantageous if the air gap is designed in the form of a truncated conical recess or shell with its inner or smallest diameter in close proximity to the extrusion outlets or mouths, i.e. to provide a radial facing flange on the nozzle plate or die surrounding the smallest exit or outlet ends of the extrusion channel and radially increasing in thickness as it extends outwardly to provide an outer circumferential surface in supporting contact with and having substantially the same width as the front ring-shaped flange or leg of the coil core.

A further deflection of the magnetic field lines along the extrusion channels is achieved in an advantageous manner by means of at least one additional hollow space which is fully enclosed by the wall of the die or any rearwardly extending portion thereof falling axially between the points of contact of the induction coil core on the assembly. Alternatively, a single annular gap space can be recessed inwardly from the entire circumferential surface bounded by the coil windings between the core flanges or legs and/or still another completely enclosed gap space can be positioned concentrically around an enlarged feed inlet to the extrusion bores in an axial position behind but adjacent to the back flange or leg of the coil core so as to define together with the essential gap space or spaces between the two core flanges a magnetizable path through the nozzle plate or die from the back flange of the core into the central portion immediately adjacent the extrusion channels.

In general, the strength of the nozzle plate or die with respect to the load placed thereon by the extrusion pressure is not impaired by the recessed slot or air gap. However, in order to assure the strength of its facing surface, i.e. the facing flange portion which is constricted in width as it extends radially inwardly, the air gap or space can be interrupted or bridged by at least two or more radially extending ribs or else the hollow spaces can be filled with any suitable nonmagnetizable material.

Figure 2:
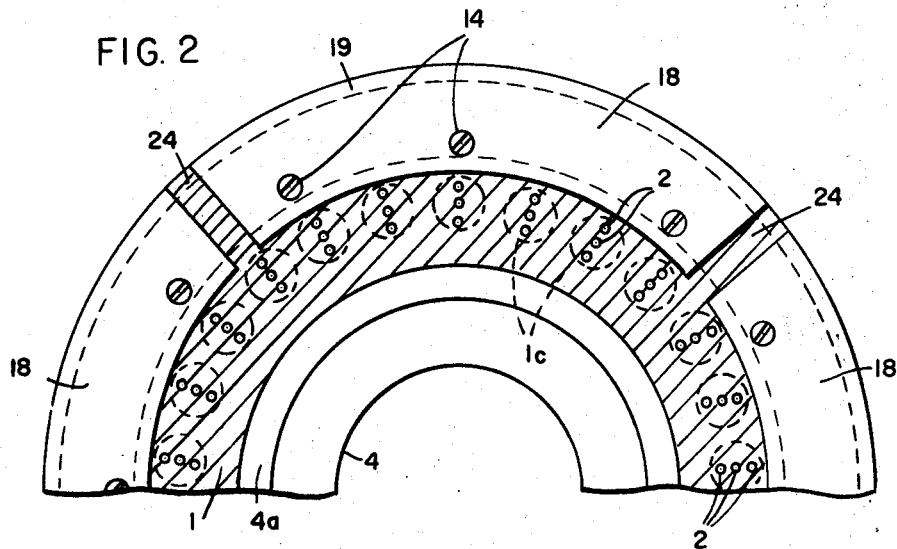
Figure 3:
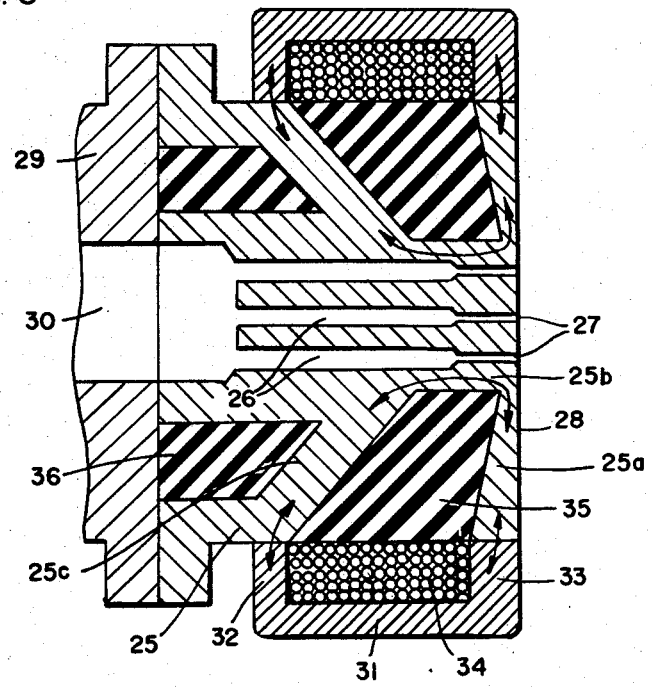

The construction and arrangement of the various elements of the device according to the invention are explained in greater detail with the aid of the accompanying drawings in which:

FIG. 1 is a cross-sectional view along the axis of a preferred embodiment of an inductively heated extrusion die of the invention which is adapted for use as a water-cooled granulator;

FIG. 2 is a cross-sectional view taken perpendicular to the axis of the extrusion die on line A—A of FIG. 1, with all portions other than the nozzle plate being omitted and the lower portion being cut away entirely; and FIG. 3 is a cross-sectional view along the axis of another embodiment of an inductively heated extrusion die according to the invention wherein the extrusion channels are arranged in a central axial portion of the die with heat supplied by a single induction coil.

Referring first to FIGS. 1 and 2, an extrusion die is represented as a particularly preferred embodiment adapted to be used in apparatus for the extrusion and granulation of a thermoplastic substance, e.g. high molecular weight synthetic polymers supplied from a screw extruder in molten form through a feed passageway into a plurality of concentrically arranged extrusion bores in the nozzle plate of the die.

In particular, as shown in FIGS. 1 and 2, the extrusion die is faced by a nozzle plate 1 in which there is arranged a plurality of nozzle bores 2 in three adjacent concentric rings so as to provide an annular field of outlet openings 3 on the face 1a of the nozzle plate. The cutting edges of a rotary cutting device (not shown) can be mounted to sweep across the face of the nozzle plate in order to cut or granulate the thermoplastic substance as it is being extruded in the form of cylindrical rods or strands from the face of the die. The nozzle bores 2 can of course be arranged in different configurations, e.g. in more or fewer concentric annular or circular tracks and/or offset on different radial lines from one another. These bores 2 preferably have their axes parallel to the central axis of the die and parallel to each other and extend backwardly from the face of the nozzle plate 1 in a coaxial extension thereof 1b which contains an enlarged annular feed channel 1c defined in part by the nozzle plate hub 4 and an outer cylindrical housing or tubular mounting piece 15.

Thus, in this specific construction of the extrusion die, the nozzle plate 1 is annular in shape with a central hub or cylindrical shaft 4 containing an axial bore adapted to receive a tube 5 which supplies a fluid cooling medium to cool and convey the extruded and granulated substance as it emerges from the face of the nozzle plate. The outlet end of the tube 5, constructed as a flange 6, is connected by means of any suitable bolts or screws (not shown) to the nozzle plate 1. Between this flange 6 and the projecting shoulder or radial ledge 4a of the nozzle plate 1 to which it is attached, there are simultaneously arranged and screwed or clamped tightly together a ring-shaped gasket 7 for thermal insulation, the flanged leg 8 of the core 9 of the inner induction coil 10, and an annular or ring-shaped member 11 composed of a non-magnetizable material.

In the mouth of the tube 5, there is fastened by means of cross-members or bridging ribs 12 a conically flared guide or baffle member 13 designed to radially deflect the flow of the cooling fluid outwardly across the face of the nozzle plate 1.

The nozzle plate 1 is also firmly fastened to the outer body or housing 15 of the extrusion die by means of a number of concentrically arranged screws 14. Around the outer circumferential surface of the nozzle plate 1 and overlapping the corresponding outer surface of the housing 15, which acts as an extension of the nozzle plate, there is applied the induction coil 16 having a flanged core 17 with base 17a and two spaced legs or annular flanges 22 and 23 enclosing the coil windings 16. This core 17, which also acts as an outer jacket or housing for the coil, concentrates the lines of force generated by the induction coil, and leg 22 contacts the outer circumferential surface of the housing at 22a while leg 23 contacts the outer surface of the nozzle plate at 23a. In a similar manner, the radially outwardly extending legs or end portions of the inner coil core 9 contact the nozzle plate 1 at surface 20 and at the hub surface 21.

From the outer circumferential surface of the nozzle plate 1, directly adjacent the contact surface 23a, there is positioned an annular air gap 18 which at its outermost end or circumference must fall axially between the core legs 22 and 23 and, beginning at this point, must extend inwardly up to the immediate vicinity of the nozzle bores 2. Instead of forming a flat ring, this closed annular air gap 18 as viewed spatially is designed as the genetrix of a truncated cone with its smaller inner diameter lying closely next to the mouths or outlet openings of the nozzle bores 2. A second annular hollow space 19 is also located axially intermediate the two legs of the induction coil 17, in this case formed by annular recessed portions of the nozzle plate 1 and the housing 15 where they join together. This second air gap 19 thus lies axially adjacent to the first air gap 18 and is advantageously positioned concentrically between the induction coil and the enlarged feed inlet 1c with its outer diameter at a short radial distance from the outer circumference of the nozzle plate and housing assembly and its inner diameter at about the same radial distance from the feed inlet.

As shown in FIG. 2, the nozzle plate is more rigidly supported by means of the radial ribs 24, which total four in number spaced equidistantly around the annular gap space 18. FIG. 2 further illustrates the concentric or circular lines on which the nozzle bores 2 fall with each set of three bores being fed from a common cylindrical feed channel or passageway 1c which may also be a single enlarged annular space recessed in the back of the nozzle plate 1 and/or connected to a corresponding annular passageway between the nozzle plate hub 4 and the outer housing 15 as indicated in FIG. 1.

Each of the induction coils 10 and 16 can be separately operated by means of applying an alternating current in the usual manner, preferably at low frequencies, e.g. below 100 c.p.s. The number of windings in the coils and other features of their structure can be readily adapted to any particular extrusion die with reference to the amount of heat to be generated. However, it is a particular advantage of the extrusion die constructed according to the invention that with a minimum expenditure of power, considerably more heat is generated by induction directly along the extrusion channels and particularly near the outlet openings thereof.

Thus, in the preferred embodiment of FIGS. 1 and 2, the annular gap space 18 is not perpendicular to the axis of the nozzle plate but instead has a radial cross-section in the form of a trapezoid with its outermost base or side aligned with the outer surface of the nozzle plate directly behind the forward leg of the coil core and its innermost base or side moved axially forwardly toward the face of the nozzle plate so as to lie as closely as possible to the outlet openings of the extrusion channels or bores. In essence, this construction provides an annularly slotted nozzle plate, i.e. a plate which carries an elongated annularly recessed slot adjacent its extrusion face, so as to provide a front annular flange connected at its outer circumference to the front leg of the induction coil core and then becoming progressively thinner as its proceeds radially inwardly until it almost meets the narrow exit or outlet end of the extrusion channels or bores.

When activating induction coil 10, the annular member 11 composed of a non-magnetizable material compels the lines of force of this coil to enter or emerge along the circumferential surface 20 of the flange or radial leg 8 of the coil core 9. The lines of force then flow between 20 and 21 and run closely along the nozzle bores 2. If the ring 11 consisted of a magnetic material or simply became an integral part of the nozzle plate hub 4, then the lines of force or so-called magnetic field lines would enter or emerge at the contact surface between annular leg 8 and ring 11 and continue in a path extending through surface 4a, i.e. at some distance from the nozzle bores 2 and directly adjacent the coil 10. The heat then generated in proximity to the coil 10 could only flow by heat conduction through the nozzle plate to the nozzle bores 2.

The magnetic field lines induced by the outer induction coil 16 enter and leave the jacket or core 17 through the contact surfaces 22a and 23a and flow through the housing member 15 and nozzle plate 1, and in doing so, are compelled to flow around the air gaps 18 and 19. This deflection of the lines of force causes them to flow closely along the nozzle bores 2 in the immediate vicinity of the outlet openings or mouths 3 so that heat is generated directly at these points and need not be brought to these poses of the invention. The presence of the second gap 18 is quite critical and its exact position constricting the lines of force radially inwardly toward the nozzle bores 2 and especially their outlet ends 3 is essential for purposes of the invention. The presence of the second gap space 19 is less critical but it is advantageously placed so as to split the lines of force, as they extend in their path adjacent the nozzle bores 2 up to the rear contact surface 22a with the coil core 17, into two paths of approximately equal length, one of which flows axially along the enlarged feed inlet 1c adjoining the nozzle bores 2.

The foregoing description of the inductive heating of an extrusion die for a water-cooled granulator is also applicable to other types of extrusion dies. With suitable modifications or slight adaptations, this arrangement of parts can also be used for mono- or multi-filament extrusion dies, tubular rod or film-forming dies, slotted film-forming dies or the like.

A somewhat simplified embodiment of the invention is illustrated in FIG. 3, using only a single induction coil. In this instance, the cylindrical nozzle plate or extrusion die 25 contains a plurality of elongated bores or channels 26 with smaller outlets 27 emerging at the face 28, these bores being arranged in any desirable pattern close to and parallel with the central axis of the extruder. In place of these bores for the extrusion of relatively small rods or filaments, it is also feasible to provide a single annular slot for the extrusion of a hollow body. The extrusion die 25 is mounted by means of suitable bolted flanges or the like to the end of an extruder housing 29 with an axial feed passageway 30 extending partly into the die 25 and providing a common feed line for supplying the hot molten plastic to the bores 26.

The jacket or shell with base 31 and radial flanges or leg portions 32 and 33, forming the core of the induction coil and enclosing the coil windings 34 is mounted coaxially around the outer circumferential surface of the die 25 in radial alignment at its forward end with the die face 28 and extending backwardly over substantially the entire length of the elongated bores 26. Directly beneath the coil windings 34, the die has a radially recessed annular slot filled with a non-magnetizable material 35 so as to form a concentric annular member with a trapezoidal radial cross-section. The outermost base of the trapezoid corresponding to the outer circumference of the non-magnetizable insert 35 extends across the entire width of the coil winding 34 between the two core flanges 32 and 33. The innermost base corresponding to the smaller inner circumference of insert 35 is displaced axially forwardly toward the face 28 of the die so as to lie in the immediate vicinity of the outlet openings 27 and adjacently parallel or concentric with only the front or exit portion of the bores 26.

A second concentric annular ring 36 of the same non-magnetizable material is positioned at a spaced distance intermediately of the central feed bore 30 and the outer circumference of the die 25 with its outer circumferential surface extending axially inwardly from the back of the die up to about the rear leg or flange 32 of the coil core and with its forwardly projecting edge or surface conically inclined or tapered in parallel relationship to the correspondingly conically tapered rear edge or surface of the insert 35.

With this arrangement, the magnetizable nozzle plate or die 25 together with the core 31 provides a closed and carefully defined circuit for the magnetic field lines which extend from flange or leg 33 through the radially inwardly constricted die portion 25a, along the front end of the bores through the immediately adjacent axial die portion 25b, through the tapered die section 25c between inserts 35 and 36 and then radially outwardly through flange 32 of the core 31. In this case, heat is strongly applied by induction over the forward portion of the elongated bores 26 where a premature cooling of the thermoplastic melt is apt to be most troublesome. The lines of force are then deflected axially outwardly where less heat is required at the feed end of the bores 26, e.g. where the enlarged feed bore 30 often retains sufficient heat in the thermoplastic melt to avoid any premature cooling even during the initial passage through the smaller bores 26.

Other minor modifications and variations will be apparent within the scope of the present invention, it being understood that the foregoing description of particular embodiments merely serve to illustrate rather than limit the exact construction of the extrusion die or nozzle plate.

The invention is hereby claimed as follows:

1. An extrusion die for the inductive heating of a thermoplastic substance during its extrusion therefrom which comprises:

a nozzle plate composed of a magnetizable material and containing one or more extrusion channels opening at one end thereof on the face of said plate as the shaped outlets for the extruded thermoplastic substance, said channels being arranged radially inwardly from the outer circumferential surface of said nozzle plate;

means to feed said thermoplastic substance to said nozzle plate including a coaxial extension thereof which has an enlarged feed pasasgeway axially aligned and in fluid communication with said one or more extrusion channels at the inlet ends thereof;

an induction coil mounted concentrically on the outer circumferential surface of said nozzle plate, said coil including a flanged core having a base member and two spaced legs directed substantially radially inwardly with the coil windings arranged therebetween and with the ends of said legs in closed circuit contact with the magnetizable material of said nozzle plate, the forward leg of said core being positioned axially forward of the inlet end of said one or more extrusion channels and adjacent the face of said nozzle plate; and said nozzle plate being so constructed and arranged as to contain at least one annular gap space adapted to contain a non-magnetizable substance, said gap space having its outermost diameter axially positioned between the legs of the induction coil core and extending inwardly away from the outer circumferential surface of said nozzle plate up to an area defined by its innermost diameter in the immediate vicinity of said one or more extrusion channels.

2. An extrusion die as claimed in claim 1 wherein said extrusion channels are arranged in an annular concentric portion of the nozzle plate surrounding a central axial bore adapted to receive a tube for the passage of a fluid cooling medium, a second induction coil is mounted concentrically around the inner circumference of the nozzle plate on a recessed shoulder thereof extending axially inwardly from the face of the nozzle plate, said second coil including a flanged core which is in approximate axial alignment with said flanged core of said first induction coil and which carries the coil windings between its two spaced legs in closed circuit contact with the magnetizable material of said nozzle plate such that at least the forward leg thereof extends radially inwardly of the coil windings toward said one or more extrusion channels, and an annular ring composed of a non-magnetizable material arranged concentrically within said one or more extrusion channels at a position between said two legs of the flanged core and extending axially from said forward leg along the inner circumferential surface of said coil windings.

3. An extrusion die as claimed in claim 1 wherein a first annular gap space is recessed inwardly from the outer circumferential surface of the nozzle plate directly beneath at least that portion of the coil winding adjacent said forward leg of the coil core.

4. An extrusion die as claimed in claim 3 wherein said annular gap space is shaped in the form of a truncated cone with its inner diameter extending axially forward of its outer diameter to provide a concentric facing flange on said nozzle plate surrounding the outlet openings of said one or more extrusion channels with the thickness of said facing flange decreasing radially inwardly from its outer circumferential surface.

5. An extrusion die as claimed in claim 3 wherein at least a second annular gap space is completely enclosed and positioned axially adjacent said first annular gap space between it and the rear leg of said coil core.

6. An extrusion die as claimed in claim 5 wherein said second annular gap space is positioned concentrically around the enlarged feed passageway in the coaxial extension of said nozzle plate.

7. An extrusion die as claimed in claim 1 wherein the coaxial extension of said nozzle plate located axially rearwardly of said rear leg of said coil core contains an additional enclosed gap space adapted to deflect the magnetic field lines radially inwardly and forwardly from said rear leg.

8. An extrusion die as claimed in claim 1 wherein one or more of said annular gap spaces are bridged by at least two radially extending ribs.

9. An extrusion die as claimed in claim 1 wherein one or more of said annular gap spaces are filled with a non-magnetizable material.

References Cited

UNITED STATES PATENTS

| | | |
|---|---|---|
| 2,194,283 | 3/1940 | Kidd. |
| 2,893,055 | 7/1959 | Wenzel. |
| 2,904,664 | 9/1959 | Rothacker. |
| 2,931,408 | 4/1960 | Dwyer et al. |
| 3,129,459 | 4/1964 | Kullgren et al. |
| 3,461,495 | 8/1969 | Swickard et al. |

WILLLIAM J. STEPHENSON, Primary Examiner